J. S. GAGE.
Seed Gatherer.
No. 12,095. Patented Dec. 19, 1854.
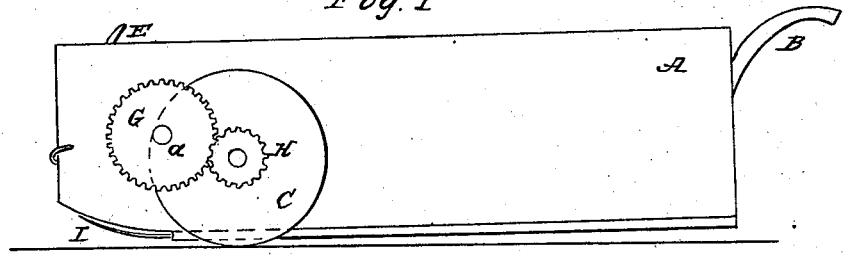
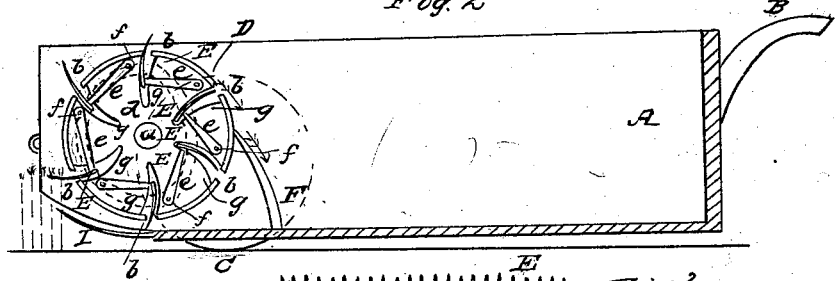
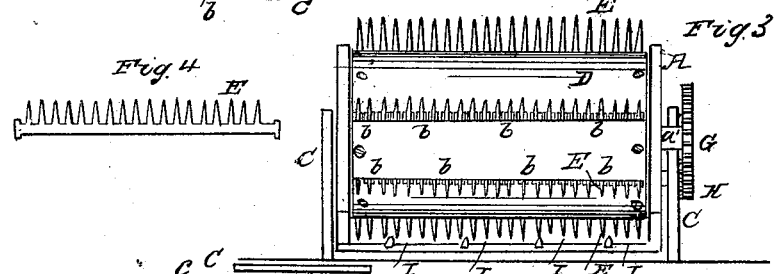
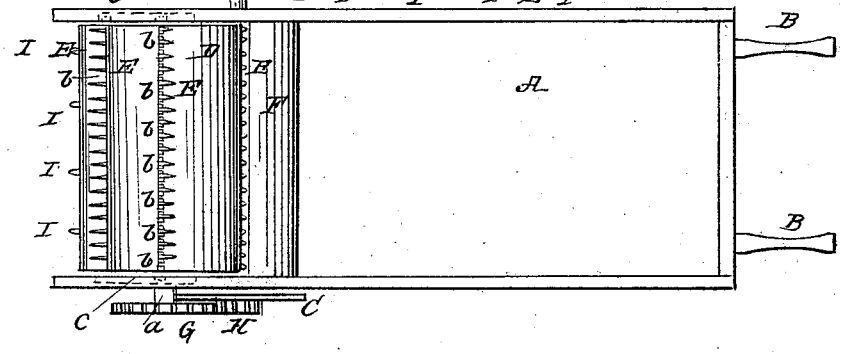

UNITED STATES PATENT OFFICE.

JOHN S. GAGE, OF DOWAGIAC, MICHIGAN.

IMPROVEMENT IN CLOVER-HARVESTERS.

Specification forming part of Letters Patent No. 12,095, dated December 19, 1854.

*To all whom it may concern:*

Be it known that I, JNO. S. GAGE, of Dowagiac, in the county of Cass and State of Michigan, have invented a new and Improved Machine for Gathering Clover and other Seeds; and I do hereby declare that the following is a full, clear, and exact description of the same, reference being had to the annexed drawings, making a part of this specification, in which—

Figure 1 is a side view of my improved machine. Fig. 2 is a longitudinal vertical section of the same, the plane of the section being through the center. Fig. 3 is a front view of the same. Fig. 4 is a detached view of one of the toothed bars. Fig. 5 is a plan or top view of the machine.

Similar letters of reference indicate corresponding parts in the several figures.

This invention relates to a new and improved machine for gathering clover and other seeds; and it consists in having a cylinder provided with a series of toothed bars, so arranged that as the cylinder rotates the teeth will be projected forward in front of said cylinder and comb the chaff and seed from the standing stalks and be withdrawn within the cylinder when at its upper part, leaving the seed and chaff upon the cylinder, the seed and chaff falling into the body of the machine by the rotation of said cylinder.

To enable others skilled in the art to fully understand and construct my invention, I will proceed to describe it.

A is a rectangular box, which forms the body of the machine. The box A is provided with two handles, B B, at its back end, and is hung upon the wheels C C, which are near its front end.

D is a hollow cylinder, the shaft $a$ of which works in the sides of the box A. This cylinder is at the front part of the box, and a short distance above the surface of the ground the cylinder is provided with a series of toothed bars, E—six are represented in Fig. 2, but more or less may be employed, as occasion requires. The teeth of the bars are somewhat curved, as clearly shown in Fig. 2, and work through holes or apertures $b$ in the periphery of the cylinder. (See Figs. 2, 3, and 4.) The bars are within the cylinder, and their ends work or fit in eccentric or cam shaped grooves $c$ cut in the inner sides of the box A, one groove $c$ in each side. The dotted lines in Figs. 2 and 5 show the eccentric or cam shaped grooves. Each toothed bar is connected to the sides or heads $d\ d$ of the cylinder by arms $e\ e$, one at each end of the bars, said arms being secured at one end to the heads $d$ by pivots $f$, and the opposite ends pass into the bars E. (See Fig. 2.) Each head $d$ of the cylinder has curved slots $g$ cut in it, through which the ends of the bars E pass. (See Fig. 2.)

F is a curved guide at the back part of the cylinder D. (See Figs. 2 and 5.)

G is a toothed wheel, placed at one end of the shaft $a$ of the cylinder D. This toothed wheel G gears into a pinion, H, secured to the axle $h$ of the wheels C C. (See Figs. 1, 3, and 5.)

I are guard-teeth, attached to the front end of the bottom of the body or box A, as shown more particularly in Figs. 1 and 2.

Operation: As the machine is drawn along the cylinder is made to rotate by means of the gearing G H, and the teeth or toothed bars are forced outward, the teeth projecting out from the cylinder D through the holes $b$ in consequence of the eccentric or cam shaped grooves $c\ c$. The teeth comb the seed and chaff from the standing stalks (see Fig. 2) as they pass upward, and when they are at the top of the cylinder, or in a vertical position, the teeth are drawn in the cylinder, owing to the shape of the grooves $c\ c$, and the seed and chaff are stripped from the teeth and fall into the box A. (See arrows, Fig. 2.) By having the teeth pass or work through the holes $b$ in the periphery of the cylinder they are prevented from being clogged or choked. The guard-teeth I prevent the teeth on the bars from coming in contact with the ground in consequence of any unevenness of the same.

The above machine is simple in construction and works well. It is not expensive to manufacture, nor liable to get out of repair.

I do not confine myself to any particular mode of operating the toothed bars E, for various devices may be employed for that purpose.

Having thus described my invention, what I claim as new, and desire to secure by Letters Patent, is—

Gathering clover and other seeds from the standing stalks by means of a hollow cylinder, D, provided with a series of toothed bars, E, arranged, as herein shown or otherwise, so that the teeth of said bars will as the cylinder rotates be forced outward through the holes $b$ in front of the cylinder and comb the seed and chaff from the stalks, the teeth being drawn within the cylinder when at its top and the seed and chaff stripped from them so that they may pass into the box or body A, as herein described.

JOHN S. GAGE.

Witnesses:
 ANDREW KIRKWOOD,
 PETER B. GAGE.